United States Patent [19]
Heurman et al.

[11] Patent Number: 5,643,076
[45] Date of Patent: Jul. 1, 1997

[54] PLUG FOR CLOSING THE GULLET OF A SLAUGHTERED ANIMAL AND DEVICE FOR POSITIONING SAME

[76] Inventors: Erwin Herman Gerardus Heurman, Brinkstraat 187, NL-7512 ED Enschede; Gerrit-Jan Hofte Koesveld, Windmolenweg 54, NL-7548 BM Boekelo; Johan Gerrit Roerink, Broekheurnerweg 94 A, NL-7418 PZ Haaksbergen, all of Netherlands

[21] Appl. No.: 500,970

[22] PCT Filed: Feb. 7, 1994

[86] PCT No.: PCT/NL94/00032
    § 371 Date: Sep. 20, 1995
    § 102(e) Date: Sep. 20, 1995

[87] PCT Pub. No.: WO94/17669
    PCT Pub. Date: Aug. 18, 1994

[30]  Foreign Application Priority Data

Feb. 8, 1993  [NL]  Netherlands ............... 9300244
    Oct. 4, 1993  [NL]  Netherlands ............... 9301700

[51] Int. Cl.[6] ............................................. A22C 21/00
[52] U.S. Cl. ................................... 452/176; 138/89
[58] Field of Search ........................... 452/176; 138/89

[56]  References Cited

U.S. PATENT DOCUMENTS

| 3,918,444 | 11/1975 | Hoff et al. ............... 128/130 |
| 4,241,735 | 12/1980 | Chernon ................. 128/344 |
| 4,563,182 | 1/1986 | Stoy et al. ............... 604/285 |
| 4,981,465 | 1/1991 | Ballan et al. ............ 600/32 |
| 5,207,827 | 5/1993 | Tokare ................... 106/212 |
| 5,453,044 | 9/1995 | Abler et al. ............. 452/176 |

FOREIGN PATENT DOCUMENTS

| 258627 | 7/1912 | Germany. |
| 8103016 | 1/1982 | Netherlands ......... A22B 5/14 |
| 436009 | 11/1967 | Switzerland ......... A22B 5/14 |
| 16693 | 9/1911 | United Kingdom. |
| WO9006685 | 6/1990 | WIPO ................. A22B 5/00 |

*Primary Examiner*—Willis Little
*Attorney, Agent, or Firm*—Webb Ziesenheim Bruening Logsdon Orkin & Hanson, P.C.

[57]  ABSTRACT

The invention lies in the field of slaughtering animals in a slaughterhouse. One of the operations during the slaughtering process is the removal of the head of the animal, whereby the gullet is severed. The invention has for its object to offer provisions which can ensure an effective and rapid closure of the gullet. For this purpose the invention generally provides a plug for closing the gullet of a slaughtered animal from which the head has been removed, which plug is adapted to be inserted into the gullet and has a larger effective diameter than the gullet for closing.

8 Claims, 8 Drawing Sheets

PLUG FOR CLOSING THE GULLET OF A SLAUGHTERED ANIMAL AND DEVICE FOR POSITIONING SAME

BACKGROUND OF THE INVENTION

The invention lies in the field of slaughtering animals in a slaughterhouse. One of the operations during the slaughtering process is the removal of the head of the animal, whereby the gullet is severed. The stomach contents of an animal suspended from the hind legs will hereby move downward through the gullet and could there cause bacteriological infection of meat parts, work-floor and following locations, such as de-boning tables and conveyor belts.

Hygienic slaughter is mandatory in most countries. The possibilities heretofore have however been very limited up to the present. For example the gullet can be at least more or less closed off by means of an elastic ring. A drawback of this known method is that it is time-consuming and does not guarantee a reliable closure of the gullet.

From CH-A-436 009 a plug is known, which is designed to be introduced into the wind pipe of a slaughtered animal. After introducing such prior art plug the wind pipe is sufficiently closed to prevent the entrance of rinsing water.

The prior art plug consists of a plurality of parts and has therefore a rather complicated structure which makes the plug relatively difficult to produce and therefor expensive.

The invention has for its purpose to provide a plug adapted to ensure an effective and rapid closure of the gullet. It is a further purpose of the invention to design a plug in a way such that it can be readily manufactured at low costs.

SUMMARY OF THE INVENTION

For this purpose the invention generally provides a plug as stated in claim 1. Claims 2–7 give alternatives.

The use of biodegradable material has the advantage that after the slaughtered animal has been processed the plug no longer has to be removed. Considered suitable as starch are in principle all normal commercial starches, for example grain starches based on maize, wheat, rice, barley etc., tuber starches based on potato, tapioca etc., and other starches. The starches can have an increased amylose content and/or and increased amylopectin content. A starch derivative can be prepared on the basis of chemical, physical and/or biotechnological treatments.

Biodegradable materials, in particular those based on starches or derivatives thereof, display a quite strong moisture-absorbing, for example hygroscopic character. As a result the plug can be difficult to insert into the moist gullet as it adheres rapidly to the inner wall thereof. It is therefore advantageous to embody a plug such that the moisture-absorbing, for example hygroscopic, properties are limited at least on the outer surface, so that in any case insertion can take place without difficulty. In this respect a plug of biodegradable material is therefore recommended, the outer surface of which is subjected to a treatment to reduce the moisture-absorbing, for example hygroscopic, properties thereof.

Such a treatment can be based on arranging a coating layer, consisting for example of a powder, an optionally biodegradable lacquer, glycerine or other suitable material, or on the action of a gas, such as nitrogen, oil, water or another liquid with a suitable temperature.

Given in claims 9–15 are specifications of devices with which a plug can be inserted into the gullet.

BRIEF DESCRIPTION OF THE DRAWINGS

The invention will now be elucidated with reference to the annexed drawings. In the drawings.

In all figures the same components are designated by the same reference numerals.

DESCRIPTION OF THE PREFERRED EMBODIMENTS

Figure 1:
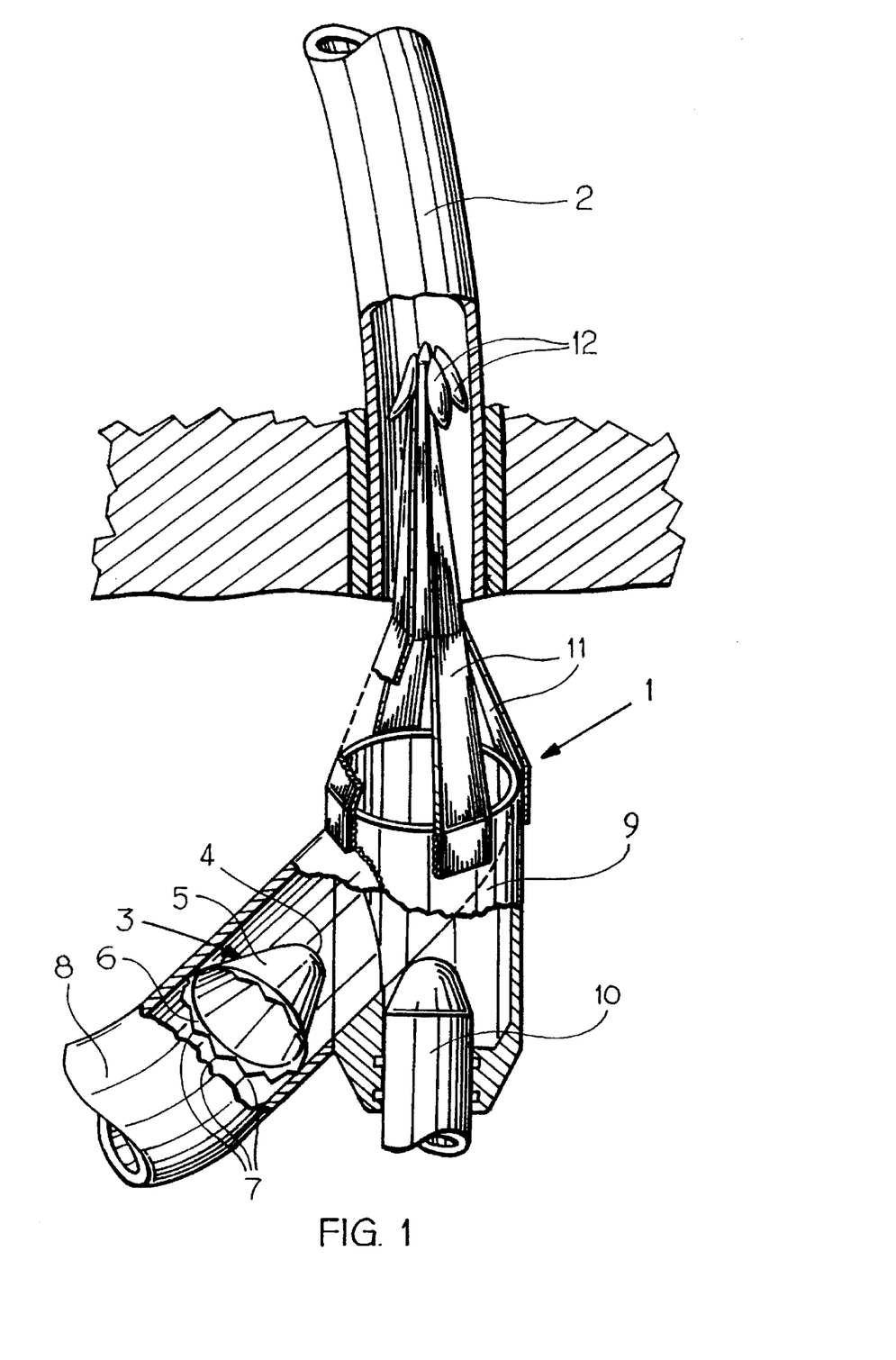
FIG. 1 shows a partially broken away perspective view of a device for inserting a closing cone in a gullet in the phase in which the device is inserted into the gullet.

FIG. 1 shows a device 1 which is intended for inserting a cone-shaped plug 3 into a gullet 2 for closing thereof. The plug 3 displays a generally conical shape with a rounded top 4, a conical body 5 and a broad bottom edge 6 with protrusions 7. From a magazine (not drawn) successive cone-shaped plugs 3 are supplied via a feed conduit 8 and carried into a tube 9 on the underside of which is movable a drive rod 10 driven by a pneumatic tool (not drawn).

Figure 2:
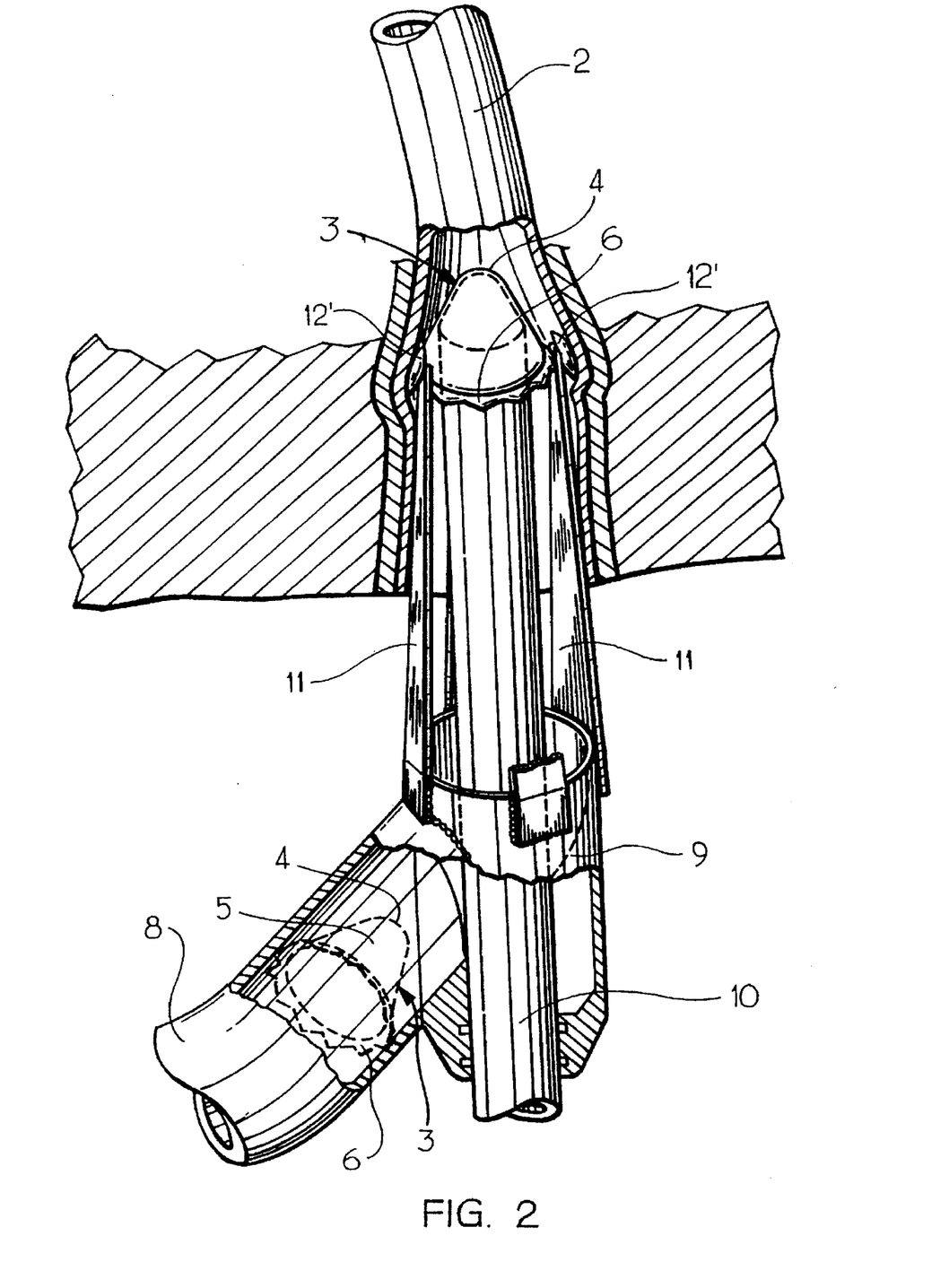
FIG. 2 shows a view corresponding with FIG. 1 in the phase where the plug is transported by the guide segments in order to be inserted into the gullet.

As FIG. 2 shows, the drive rod 10 can transport upward a plug 3 carried to the open end of tube 9.

The free end of tube 9 bears four resilient segments 11, which carry hooks 12 on their ends. Due to the tapering form of segments 11 a passing plug 3 presses these segments outward, whereby the segments 11 inserted into the gullet 2 come with hooks 12 into engagement with the inner surface of gullet 2, whereby a relative displacement of device 1 and gullet 2 is effectively blocked from that moment. This is a requirement in order to ensure that drive rod 10 can position the plug 3 in the gullet with some force. In order to obtain the desired closing properties the bottom edge 6 namely has a larger diameter than gullet 2, which can therefore only receive plug 3 by stretching. FIG. 2 shows the situation in which plug 3 is about to leave the segments 11 and can be transported further by drive rod 10.

It will be apparent that after passing the end of segments 11 the plug 3 is only supported by rod 10, and the hooks 12, which are designated with 12' in FIG. 2 in their expanded position, spring back to the position shown in FIG. 1, with the understanding that, due to the shape and the outwardly directed force, hooks 12 remain in hooking coaction with gullet 2. The cone-shaped plug 3 can thereby be displaced further by the drive rod 10.

If it is then desired to remove device 1 with segments 11 and hooks 12 from the gullet, this can then be done for example by performing a small inward directed movement followed by a rearward withdrawal, or by retracting it with force, wherein some damage to the gullet can occur.

Figure 3:
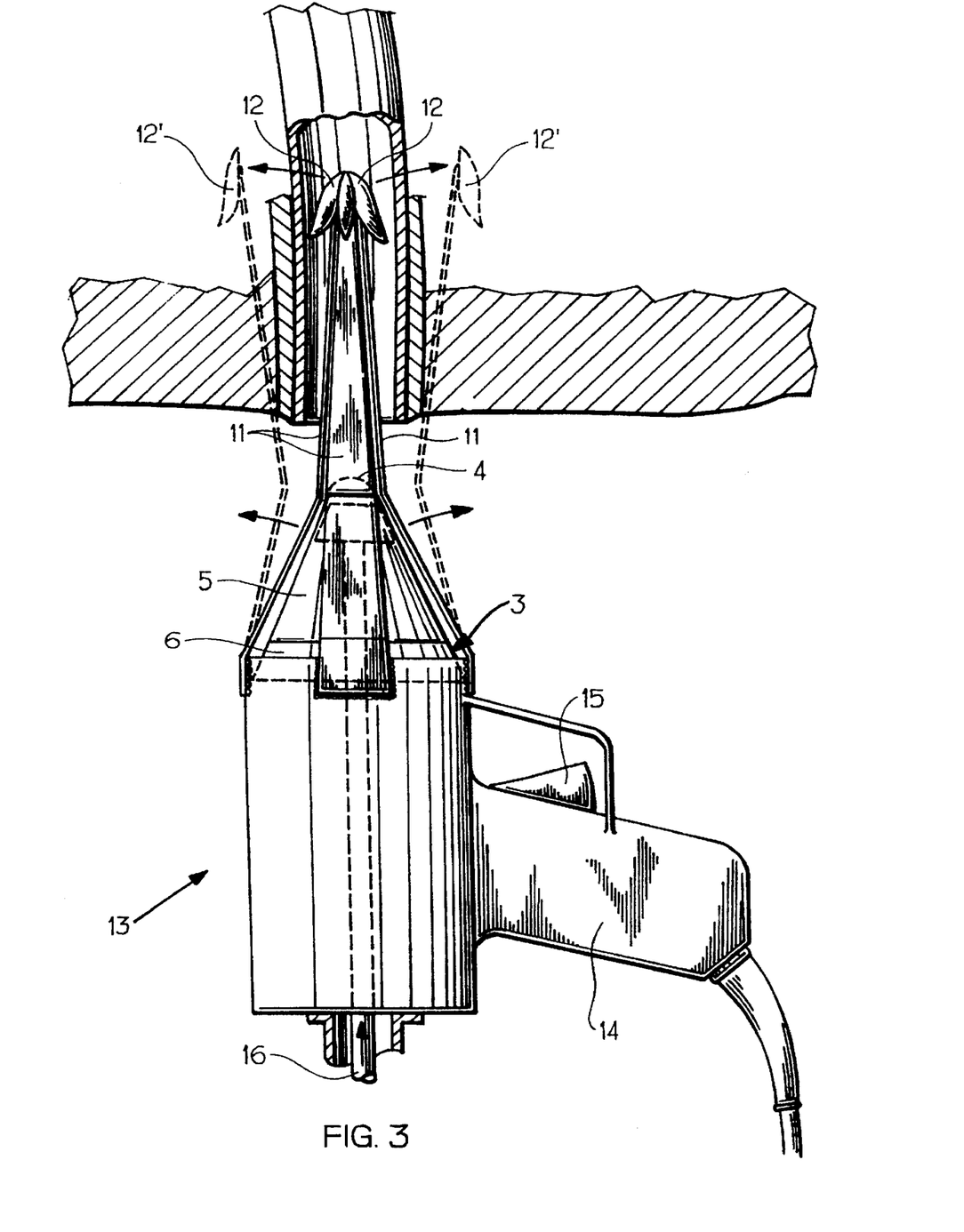
FIG. 3 shows partially in schematic side view, partially in cross-section an insertion device in the phase where a cone-shaped plug is at the point of moving apart the guide segments.

FIG. 3 shows a device 13 which comprises a pistol-grip 14 with trigger 15 with which the pneumatic tool can be controlled which drives the drive rod 16.

Figure 4A:
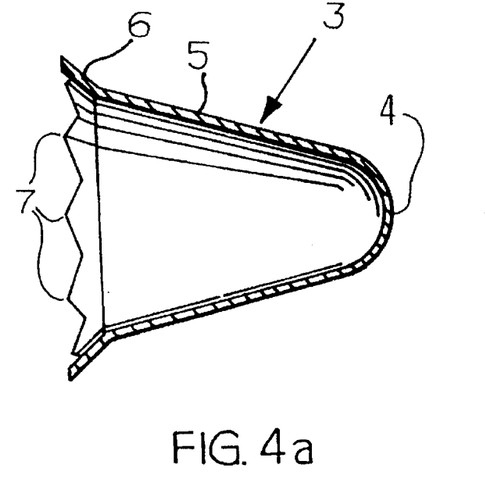
FIG. 4a shows a longitudinal section through a cone-shaped plug in a first embodiment.
Figure 4B:
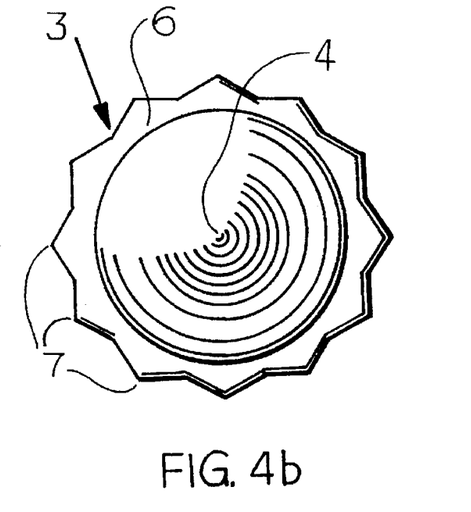
FIG. 4b shows a top view thereof.

FIGS. 4a and 4b show the plug 3 in cross-section and top view respectively.

Figure 5A:
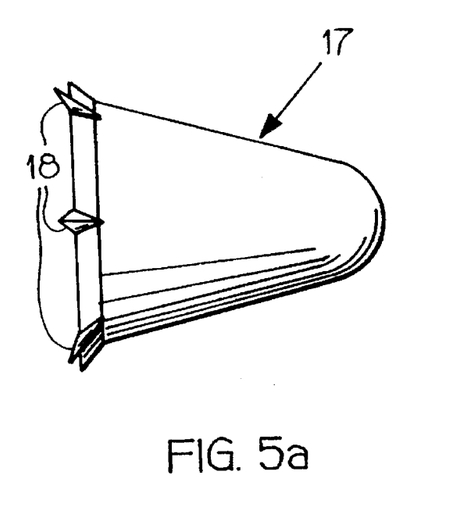
FIG. 5a shows a side view of a variant.
Figure 5B:
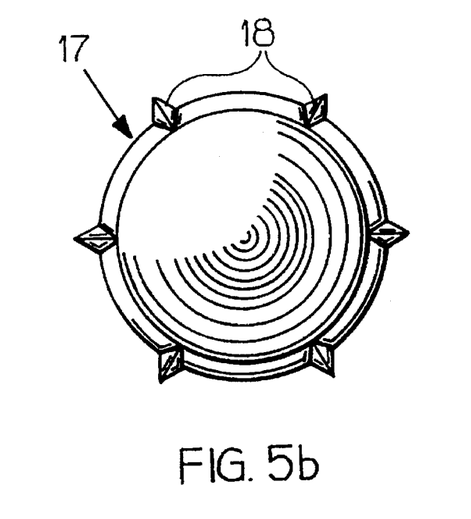
FIG. 5b shows the top view thereof.

FIGS. 5a and 5b show an alternative embodiment of plug 3. This generally cone-shaped plug 17 has a bottom edge different from the plug 3. The protrusions are embodied here as six quite sharp radial ribs 18, while protrusions 7 of plug 3 are somewhat more gently tapering serrations of the bottom edge 6.

In cases where the hooks 12 are not sufficiently capable of fixing the gullet relative to the insertion tool, in an alternative the gullet can for example be fixed relative to the insertion tool by means of clamps or a clamping ring. A clamping ring can extend for instance round the gullet and secure the gullet wall against the segments situated on the inside.

The insertion tool can also be embodied such that simultaneously with the insertion of the plug the gullet is separated from the windpipe.

The plugs can be embodied in plastic of a re-usable type. Use can also be made of biodegradable materials. Starch can also be employed whereby an inserted plug will gradually dissolve.

Figures 6, 7:
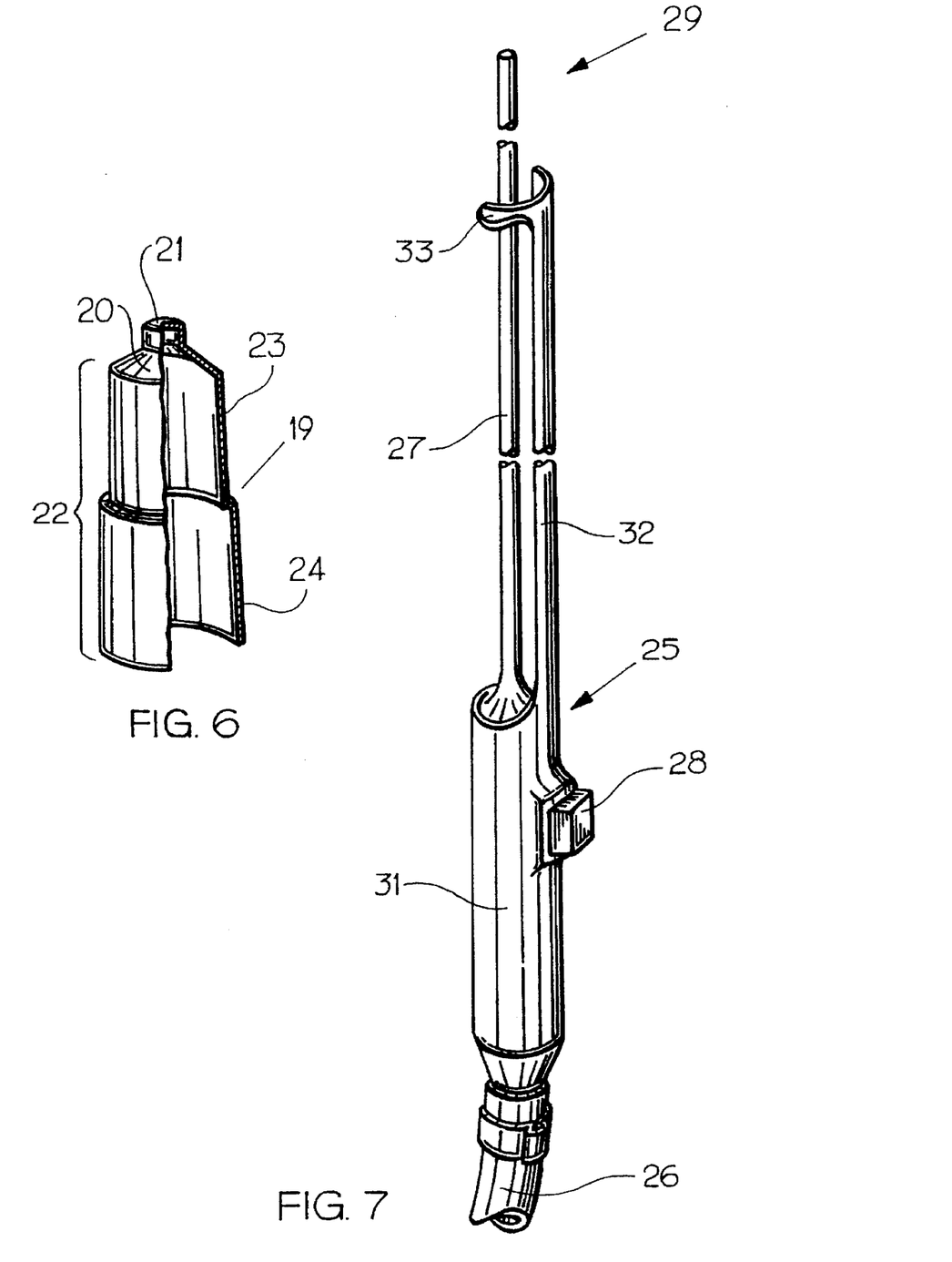
FIG. 6 shows a partly broken away perspective view of yet another embodiment.
FIG. 7 shows a perspective view of an alternative insertion device.

FIG. 6 shows a plug 19, which has the general shape of a beaker tapering toward the bottom 20. The bottom 20 has a recessed portion 21, the function of which will be explained hereinafter. Beaker 19 comprises a rotation symmetrical beaker wall 22 consisting of two truncated conical parts 23 respectively 24 mutually connecting in stepped manner.

FIG. 7 shows an insertion tool 25. This insertion tool 25 comprises a substantially rigid tube 27 connected via a conduit 26 to a source of underpressure. The connection between the flexible conduit 26 and the tube 27 can be effected by means of a hand-operated button 28. By manually pressing button 28 the tube 27 is connected to the source and by releasing button 28 the connection is again broken.

Figure 8A:
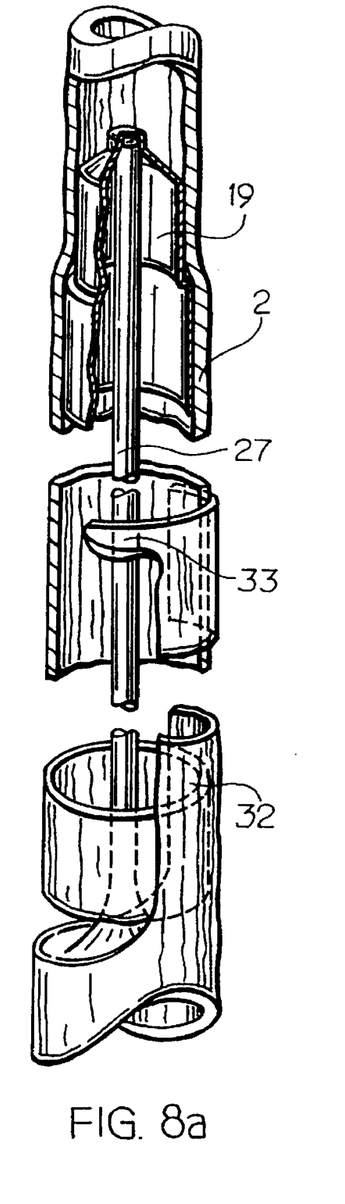
FIGS. 8a, 8b and 8c show in partly broken away perspective view three respective phases of the closing of a gullet making use of the plug according to FIG. 6 and the insertion device according to FIG. 7.

The outer diameter of tube 27, at least on its free end 29, is a little smaller than the inner diameter of the recess 21 of plug 19 (see FIG. 6). By placing the end 29 in the vicinity of the interior of recess 21 and by pressing in button 28 a plug 19 can thus be sucked thereon. The plug 19 can herewith then be inserted into gullet 2 in the manner shown in FIG. 8a. It will be apparent that during this insertion the said suction is no longer necessary. The plug 19 can thus be pressed into a desired position in the gullet by exerting a pushing force. The thereby exerted force is however still not sufficient for reliable and hygienic closure of the gullet.

Figures 8B, 8C:
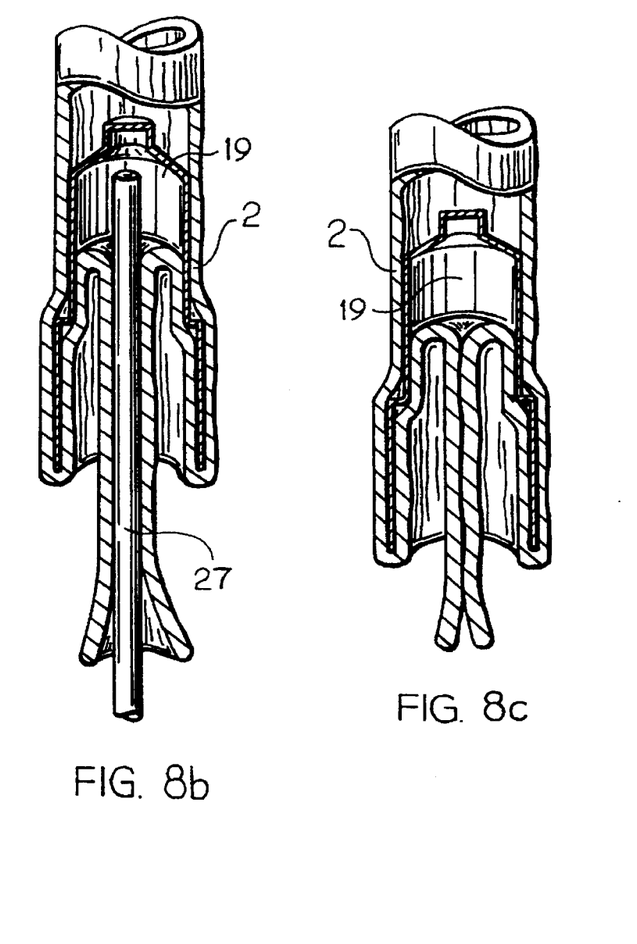

As shown in FIG. 8b, tube 27 is subsequently shifted back over a short distance and the button 28 is operated such that an underpressure is created in the interior of plug 19 as a result of which the flexible wall of the gullet is drawn inward into the interior of the beaker-shaped plug 19. FIG. 8b shows this situation.

FIG. 8c shows the situation in which tube 27 is then slid out while the underpressure is maintained. The flexible wall of gullet 2 forms in the manner shown in FIG. 8c an effective closing of the interior of plug 19. A very effective and reliable closure of the gullet is realized due to the shown form.

Figure 9:
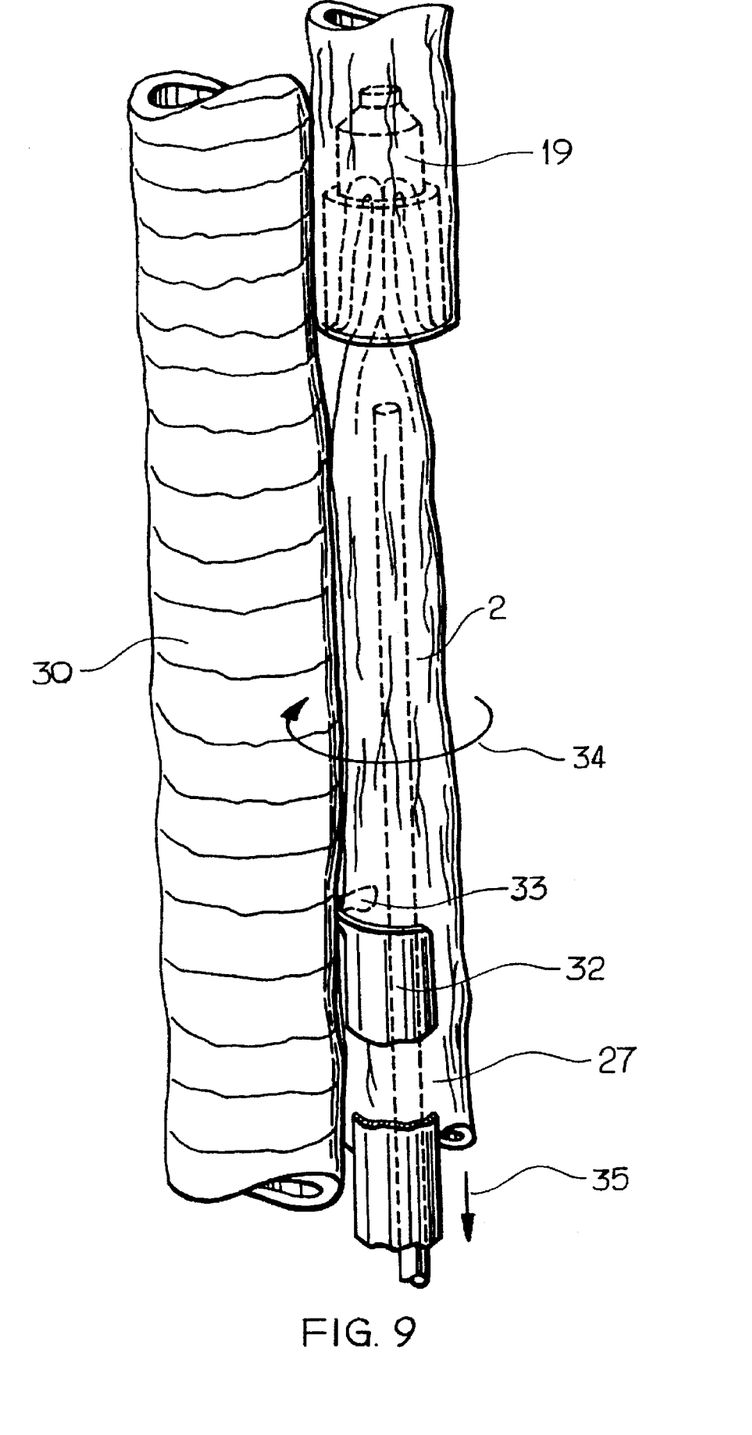
FIG. 9 shows a schematic perspective view in which is shown the manner of separating the gullet and the surrounding tissue, in particular the windpipe.

FIG. 9 shows the manner in which the gullet 2 can be separated from the surrounding tissue, for example its connection to the windpipe 30. The connection between gullet 2 and windpipe 30 is relatively weak and can therefore be broken in simple manner. As shown in FIG. 7, the device 25 carries for this purpose on its handle 31 a carrier rod 32 which extends parallel to tube 27 and which in this embodiment forms a continuation of the cylindrical handle 31. The free end of this carrier rod 32 bears a separating element 33 which in the manner indicated by the arrow 34, after rotation of handle 31 and therewith the separating element 33, can effect the intended separation during axial movement thereof.

At the moment the situation shown in FIG. 8b is reached the tube 27 can be retracted by the user. The said rotation, for example through approximately a quarter turn, can take place prior thereto whereby the separating element 33 penetrates into the tissue connecting gullet 2 to windpipe 30. During the downward directed movement 35 of handle 31 and therewith of separating element 33 the connection is broken.

Figure 10:
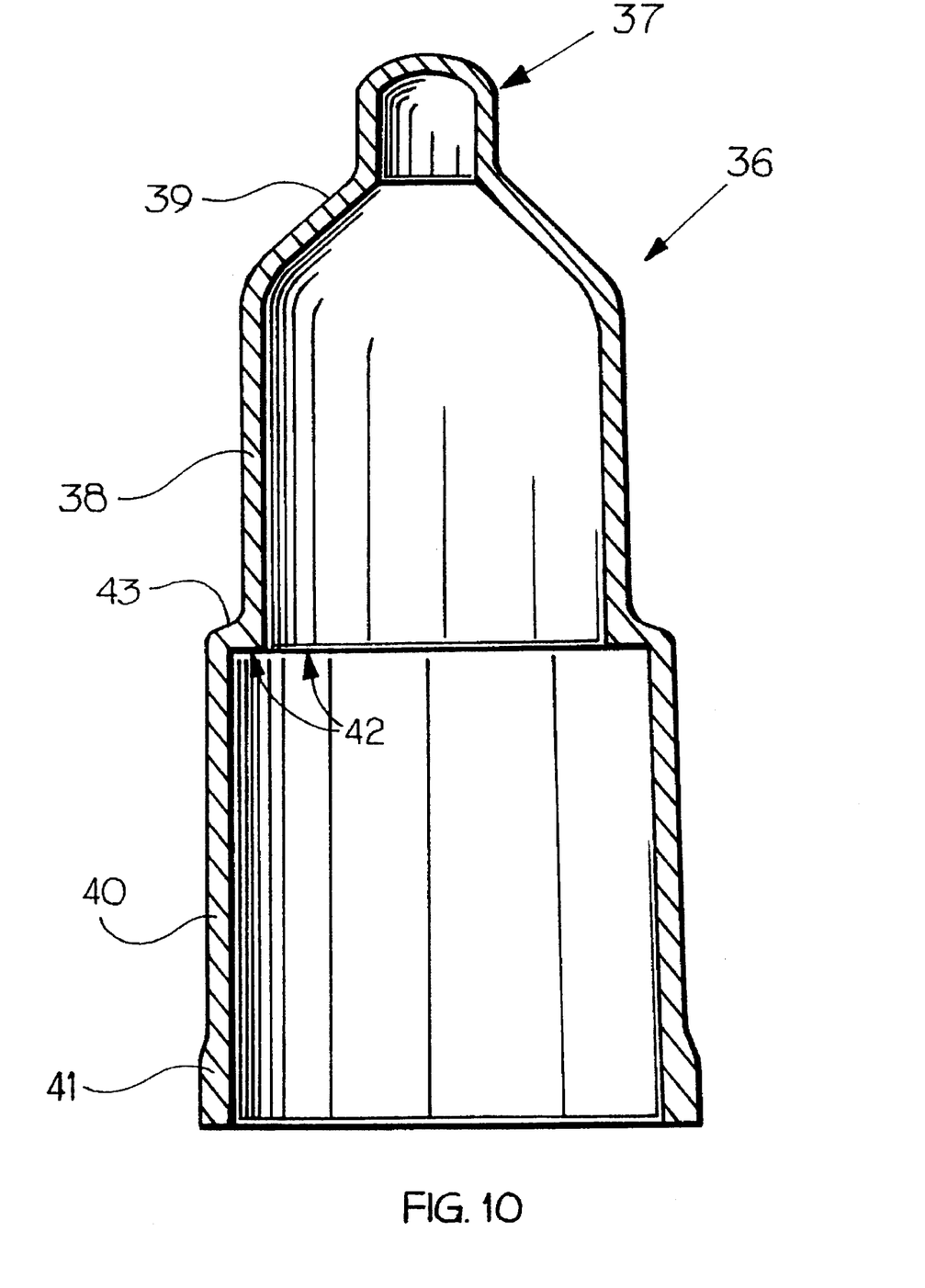
FIG. 10 shows a cross-section of a preferred embodiment of a plug.

FIG. 10 shows a cross-section of a preferred embodiment. The plug 36 has a generally rotation symmetrical form of a beaker, the bottom zone 37 of which has a comparatively small diameter wherein the operational end of the suction tube 27 fits. A broadened part 38 connects thereto via a smooth transitional zone 39. To the broadened part 38 connects a further broadened part 40 which has on its underside a thickened peripheral edge 41 to strengthen the plug 36. The transition of the inner surfaces of the parts 38 and 40 takes place via a step 42. On their outer surfaces these parts interconnect smoothly via a transitional zone 43.

It is noted that the tube 27 can have an enlarged breadth and narrowed active end. If desired the active end can be provided with one or more openings present on the outer surface, which simplifies the creation of the desired underpressure in a plug.

We claim:

1. A plug for closing a tubular member opening at the outside of a slaughtered animal and adapted to be inserted into the gullet of the slaughtered animal from which the head has been removed, the plug comprising:

a plug body comprising a biodegradable material having an outer surface and a bottom, with the outer surface being less hygroscopic than a remainder of the plug body;

wherein the plug has the general shape of a beaker such that the plug can be inserted into the gullet with the bottom of the plug positioned toward a front of the gullet, wherein the plug co-acts with a gullet wall for closure, wherein the plug has at least two parts with different inner diameters, and wherein inner surfaces of the at least two parts mutually connect via a step.

2. The plug as claimed in claim 1, wherein the at least two parts have different outer diameters and wherein outer surfaces of the at least two parts join together smoothly.

3. A plug for closing a tubular member opening at the outside of a slaughtered animal and adapted to be inserted into the gullet of the slaughtered animal from which the head has been removed, comprising:

a plug body; and a bottom, wherein the plug has the general shape of a beaker such that the plug can be inserted into the gullet with said bottom of the plug positioned toward a front of the gullet, wherein the plug co-acts with a gullet wall for closure, wherein the plug has at least two parts with differing internal diameters, wherein inner surfaces of the at least two parts mutually connect via a step, and wherein the plug includes a peripheral edge having protrusions which prevent a movement of the plug toward the opening of the gullet.

4. The plug as claimed in claim 1, wherein the plug is expandable.

5. The plug as claimed in claim 1, wherein the material is suitable for use in animal feed and/or human feed.

6. The plug as claimed in claim 1, wherein the biodegradable material is a material selected from the group consisting of starch, a starch derivative and a biodegradable polymer.

7. The plug as claimed in claim 6, wherein the outer surface of the plug comprises a coating layer of a material which is less water absorbent than the material of the plug body.

8. A plug for closing a gullet opening of a slaughtered animal from which the head has been removed, comprising:

a hollow plug body of a biodegradable material; and at least one protrusion extending from the plug body, wherein the at least one protrusion co-acts with a wall of the gullet to prevent movement of the plug toward the gullet opening.

* * * * *